(12) United States Patent
Koster (10) Patent No.: US 10,554,821 B1
(45) Date of Patent: Feb. 4, 2020

(54) IDENTIFYING AND PROCESSING NEIGHBOR SPOOFED TELEPHONE CALLS IN A VOIP-BASED TELECOMMUNICATIONS NETWORK

(71) Applicant: Noble Systems Corporation, Atlanta, GA (US)

(72) Inventor: Karl H. Koster, Sandy Springs, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

(21) Appl. No.: 16/381,722

(22) Filed: Apr. 11, 2019

Related U.S. Application Data

(60) Provisional application No. 62/758,118, filed on Nov. 9, 2018.

(51) Int. Cl.
*H04M 7/00* (2006.01)
*H04M 1/663* (2006.01)
*H04M 3/436* (2006.01)
*H04M 3/42* (2006.01)

(52) U.S. Cl.
CPC ......... *H04M 7/0078* (2013.01); *H04M 1/663* (2013.01); *H04M 3/42059* (2013.01); *H04M 3/436* (2013.01)

(58) Field of Classification Search
CPC .... H04M 7/0078; H04M 1/663; H04M 3/436; H04M 3/42059
USPC ................ 379/189, 188, 200, 193, 194, 900
See application file for complete search history.

(56) References Cited

U.S. PATENT DOCUMENTS

2007/0060097 A1* 3/2007 Edge ................. H04L 29/06027
455/404.1
2007/0140262 A1* 6/2007 Wang ................ H04L 29/06027
370/395.52

* cited by examiner

*Primary Examiner* — Thjuan K Addy (57) ABSTRACT

A method for identifying and processing neighbor spoofed calls in a VoIP carrier's switching network where individual switches may be independently upgraded to authenticate calling party numbers using SHAKEN/STIR enabled switches. The switch ascertains a local routing number ("LRN") of the calling party number for unsigned incoming calls to be terminated. If the LRN is that of the switch, and the call is unsigned, then the switch knows the call has a spoofed calling party number, and the switch may terminate the call as appropriate for a neighbor spoofed call. As the carrier enables others switches to be SHAKEN/STIR enabled, the terminating switch can determine the LRN for incoming calls and ascertain whether the call originated from a SHAKEN/STIR enabled switch. If so, the call should be signed. If not, then the switch processes the call as having a spoofed calling party number.

20 Claims, 6 Drawing Sheets

IDENTIFYING AND PROCESSING NEIGHBOR SPOOFED TELEPHONE CALLS IN A VOIP-BASED TELECOMMUNICATIONS NETWORK

CROSS REFERENCE TO RELATED APPLICATIONS

This application claims the benefit of U.S. Provisional Patent Application, No. 62/758,119, filed on Nov. 9, 2018, the contents of which is incorporated by reference for all that it teaches.

BACKGROUND

Robocalls have been described as a modern-day "scourge of civilization." These calls can be intrusive, annoying, and they frequently are the channel of choice for bad actors to perpetrate scams and frauds. Many of these calls rely upon using a "spoofed" calling party telephone number. Many techniques have been developed in an attempt to identify and reduce robocalls, but robocallers have learned to adapt. A tool that could identify when the calling number is being spoofed would be helpful.

Robocallers in the past would originate calls using by spoofing a single calling party number ("CPN", a.k.a. automatic number identification or "ANI"). In some cases, the originator of the robocalls would first determine an unused telephone number, and then originate thousands of robocalls using that unused telephone number. Then, when called parties would callback the calling party number, the called parties would quickly learn that the CPN was actually unassigned. Frequently, the called party would encounter an intercept announcement informing them that the number was not in service. This left the called party will few options as to identifying the source of the calls. Thus, the called parties could not reach the robocaller in order to request the caller to cease calling them. The called party could complain to their telecommunications provider, or to regulators, such as the Federal Communications Commission ("FCC"), but of course the calling party telephone number would be of little help in identifying the call originator.

In response to this problem of robocalls using unassigned numbers, telecommunication carriers have been authorized by the FCC to block certain types of calls. For example, if a carrier knows that a CPN is unassigned or unallocated, the carrier can now block calls using that number as the CPN, because presumably, no legitimate calls would originate using an invalid, unassigned or unallocated number.

Scammers were quick to adapt, however. Scammers learned that using a single unassigned number would result in repeated calls to called parties, and this would result in callers recognizing that value, and hence not answering the call. Or, using a single unassigned number facilitated carriers identifying such calls, who may block such calls. In response, scammers altered their strategy for selecting a CPN. They began to select and spoof a CPN value that was assigned to an existing subscriber. Called parties who called back that CPN would then encounter a subscriber who was assigned that number, but in most cases who did not originate the call and had no knowledge of such calls. Obviously, that subscriber whose number was spoofed would be receiving a large number of callbacks from angry called parties, thinking that subscriber was originating the robocalls. The only recourse for that subscriber whose number was being spoofed was to complain to their telecommunications carrier, law enforcement officials, or regulators.

Obviously, the subscriber whose number was spoofed would complain vociferously and carriers would be obliged to react in some manner. One solution was for the carrier to block any calls using that CPN or disconnect that number from service, but that would effectively mean that the spoofed subscriber could not originate calls using that number. They would have to obtain a new number which is very inconvenient. From the scammer's perspective, they would use that number for a short time, e.g., a couple of days, but then the number would be blocked. Further, if the scammers continues to use that number, it was possible, though frequently difficult, for carriers to institute procedures to trace back the call originator.

So, scammers would then simply use another number. However, various analytics based processing would detect such usage, and could identify such callers quicker and block them faster. In response, scammers became even more sophisticated and began using a technique called "neighbor spoofing." Neighbor spoofing essentially selects a CPN value based on the called party's telephone number (or "called party number", or "CdPN"). For example, if a robocaller were to call, 404-555-1234 (the CdPN), the CPN value selected would be a minor variation of the last four digits (sometimes called the 'line number'), e.g., 404-555-1267. The called party would believe that because the area code (404) and the central office code (555) were the same as theirs, that the caller must be located somewhere in the same neighborhood. Hence the term "neighbor spoofing." Furthermore, in smaller towns, where there may be only a few central office codes used by the residents. Each central office code could accommodate 10,000 numbers, so a small town may require only a few codes. Thus, called parties can quickly recognize these central office codes and they would assume the caller must be local. That is, the call was presumed to be from a local merchant or some other acquaintance in town. This has the effect of increasing the answer rates. Thus, neighbor spoofing is an effective tool for increasing the answer rate and scammers are aware of this.

In metro areas which have a number of area codes, scammers have resorted to using nearby area codes. For example, in the Atlanta metropolitan area, area codes 404 and 770 are very common, so that a local resident based in one area code would not be surprised to receive calls in from the area code. Other areas codes in Atlanta are overlay codes (e.g., 678), which cover the same geographical area associated with both 404 and 770. Again, a local resident would expect that receiving a call in the 404, 770, or 678 area code would be local. Scammers will expand the scope of neighbor spoofing to utilize nearby area codes or exchanges.

By constantly varying the CPN value in a local area, identifying robocalls is more difficult for the carrier and called parties. One called party may complain to their carrier about robocalls purportedly originating from 404 555-1267, but that number may not be used by the scammer for the next call. Further, the carrier cannot simply block all calls originating from that number, since it may be a valid, assigned number, and blocking all calls using that number would adversely impact that corresponding subscriber whose number was spoofed. Thus, identifying and mitigating neighbor spoofed calls is a significant challenge encountered by the telecommunications carriers and a great annoyance to the public. Any technology reducing the number of neighbor spoofed calls would be an improvement to reducing the number and impact of robocalls and scam calls. There is little debate among the public that reducing illegal calls, particularly illegal neighbor spoofed robocalls would be beneficial.

It should be noted that not all spoofed calls are illegal, nor unwanted. There are various business applications where calls are originated using a spoofed number. For example, many doctor's offices and hospitals will arrange for automated calls to remind patients of appointments, confirm appointment times, report test results, initiate follow-up calls, etc. These calls may originate from a service provider using the telephone number of the doctor's office as the calling party number. Thus, the called party may recognize the number as coming from their medical provider when receiving the call. However, when that number is called back, the call is not routed to the service provider originating the reminder calls (which may be a contact center providing such services), but to the medical provider's location. Thus, spoofing in this context can provide a valuable cost-saving application to medical providers. Further, such calls are legal and are desired for many of the called parties.

One technology developed to address illegally spoofed calls is called "SHAKEN" and "STIR" (abbreviated herein as "S/S").[1] One skilled in the art of robocall mitigation would be familiar with this technology, and this technology is used to authenticate the calling party number on VoIP calls. The calling party number indicated in a call origination is authenticated by the originating service provider. The calling party number is typically indicate in a call establishment request message (e.g., the signaling used to initiate a call). The verification process involves application of a digital certificate to indicate the level of attestation. This process is referred to herein as "signing" the call. Hence, a "signed" call (or a call that has been "signed") has been processed to determine the level of authentication. The digital certificate is passed along with the call setup message, which in the VoIP environment may be a session initiation protocol ("SIP") INVITE message. At the terminating service provider, the digital certificate is examined in accordance with the S/S procedures and various procedures or services may be offered to the called party based on the level of attestation indicated. For example, a text-based indicator could be provided to a user on their mobile phone reflecting the level of calling party number authentication, which may aid the called party in knowing whether to answer the call or not. In other embodiments, calls in which the calling party number cannot be attested to may be handled different.

[1] Various resources are available to provide further background details on the operation of S/S, and the teachings are not repeated herein. Further information may be found in references submitted contemporaneously with this patent application, which are incorporated by reference into this specification.

The utility of the S/S framework in identifying unauthorized spoofed calls is increased as more and more carriers deploy the technology, and as more switches within each carrier are updated and enabled with the technology. For purposes herein, a switch that is upgraded with the S/S technology to either sign call originations or recognized signed incoming calls is referred to as an "S/S configured switch" or "S/S enabled switch." For example, if only one switch, referred to as Switch A, in a carrier's network is S/S enabled, then each externally generated incoming call to Switch A (i.e., from other switch) will necessarily not have signed the calls. However, once another switch in that carrier's network, referred to herein as Switch B is enabled, then calls from Switch B to Switch A can be signed.

However, neither Switch A nor Switch B can determine whether an external unsigned call received from some other switch has a spoofed number. This limits the utility and benefits of the S/S framework occurring only to calls between Switch A and Switch B. Any other calls will be unsigned, and therefore whether spoofing is present on these other calls cannot be readily detected. Therefore, there is a need to maximize the benefits of deploying a S/S framework on the switches that have been S/S configured when working in an ecosystem of other switches which are not fully yet enabled.

In order to fully appreciate the benefits of the technology and concepts disclosed herein, a basic knowledge of the working of the S/S framework is necessary. Only a high level overview of basic aspects are including herein. In addition, a basic knowledge of telephony, telephony numbering aspects, robocall call labeling and blocking, and number portability concepts are required. Number portability involves "porting" a number based on one switch to another switch. For example, a wireline number based on one end-off switch of a wireline carrier can be ported to a wireless carrier on a different switch. To route calls, number portability involves the use of a "local routing number", which supplanted the use of the telephone number for routing purposes.

Prior to number portability, calls were routed based on the first six digits of the 10 digit telephone number. Thus, if the called number was e.g., 404-555-1234, the call was routed on the area code (or "NPA" for numbering plan area) and the central office code ("NXX" where N is a number 2-9, and X is a number 0-9). Thus, 404-555 was used to route the call to the proper destination. A central numbering authority, which those skilled in the art will be familiar with, manages the opening of NPAs and allocation of central office codes within each NPA to a carrier. With number portability, the NPA-NXX of the telephone number is no longer used to route numbers, since the number could be ported to a different switch. Thus, a "local routing number" ("LRN") concept was defined, and this number was allocated to each switch. The LRN is signaled in the various call setup protocols, and is also formatted as a 10 digit number, where the first six digits conform to the NPA and NXX numbering conventions. The last four digits of the 10 digit LRN are believed to be non-critical to routing the call to the serving switch (a.k.a. terminating switch).

SUMMARY

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

In one embodiment a switch is configured to authentic the calling party number for calls it has purportedly originated. The switch handles SIP-based voice telephone calls in a VoIP environment and receives a call which does not include a digital certificate attesting to the calling party number's authenticity (i.e., it is not signed). The switch determines a local routing number ("LRN") associated with the calling party number of that call, and determines whether the LRN is that of the switch, i.e., the LRN identifies that switch. If so, the switch can ascertain that the call involves a spoofed calling party number and processes the call accordingly. In one embodiment, the processing of a call by the switch determined to have a spoofed calling party number may involve, for example, playing an intercept announcement to the caller, routing the call to a voice mail service, or rejecting the call on behalf of the subscriber associated with the called party number.

In another embodiment, a present switch receiving the unsigned call ascertains if the calling party number is associated with a LRN identifying another switch, but which is known to sign outbound calls. If the present switch knows the other switch is configured to authenticate the calling party number, then the present switch can determine the calling party number is spoofed based on the absence of any authentication information, i.e., the digital certificate, and processes the call accordingly, including the options identified above.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

This description comprises a glossary where the following terms should be given the following meaning:

Call Establishment Request Message—a message used in a signaling protocol to initiate a call. In the SIP protocol, this would include an "INVITE" message. In a wireless protocol involving a mobile phone, such as the GSM protocol, this could include a setup message as defined by the appropriate wireless standard protocol. Other VoIP protocols would have a corresponding message used to request a call.

SHAKEN/STIR—SHAKEN is an acronym for "Signature-based Handling of Asserted information using toKENS." This includes, for example, the messages, protocols, and procedures associated with ATIS standard 1000074 (and related documents) designed to address illegitimate spoofing of telephone identifiers on IP based service provider voice networks. The SHAKEN [ATIS-1000074] specification defines a framework for using STIR protocols including PASSporT [RFC8225], RFC4474bis [RFC8224] and the STIR certificate framework [RFC8226] for implementing the cryptographic validation of an authorized originator of telephone calls using SIP. STIR is an acronym for "Secure Telephone Identity Revisited." Together, these two define a framework of an industry-developed set of protocols and operational procedures designed to authenticate telephone calls and mitigate spoofing and illegal robocalling. This is abbreviated herein as "S/S".

VoIP—Voice over Internet Protocol. A VoIP network refers to an IP-based voice network.

VoIP switch—a switching device for processing voice calls in a VoIP-based network.

S/S enabled switch—a VoIP switch configured to employ SHAKEN/STIR procedures to sign outbound calls and/or process signed incoming calls using digital certificates.

Sign—(as a verb) refers to authenticating a voice call using the SHAKEN/STIR procedures, which involves generating a digital certificate for inclusion in a call. "Signed" (as an adverb) refers to a call that has undergone the S/S signing process.

Digital Certificate—(a.k.a. "certificate") the protocol elements used in SHAKEN/STIR for applying a digital signature to reflect signing a call.

Spoofed (of Spoofing)—using a telephone number as the calling party number when originating a call at an interface to a carrier, wherein when that number is dialed, the resulting call would not be routed back to that same interface that originated the call. A calling party number may be legitimately spoofed, in which case the call originator is authorized to use that value when making calls. A calling party number may be illegitimately spoofed, wherein the call originator is not authorized to use that number for the purposes it is used for.

SIP—session initiation protocol; a signaling protocol used in VoIP networks for voice calls. SIP is one of several common VoIP signaling protocols.

Robocall—a computer originated call where a pre-recorded announcement is played to the answering party upon answering the call.

Local Routing Number ("LRN") a 10 digit number which identifies a switch. Although the number may have some similarity to a telephone number, it is distinct in application from a telephone number.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

General Overview

Figure 1:
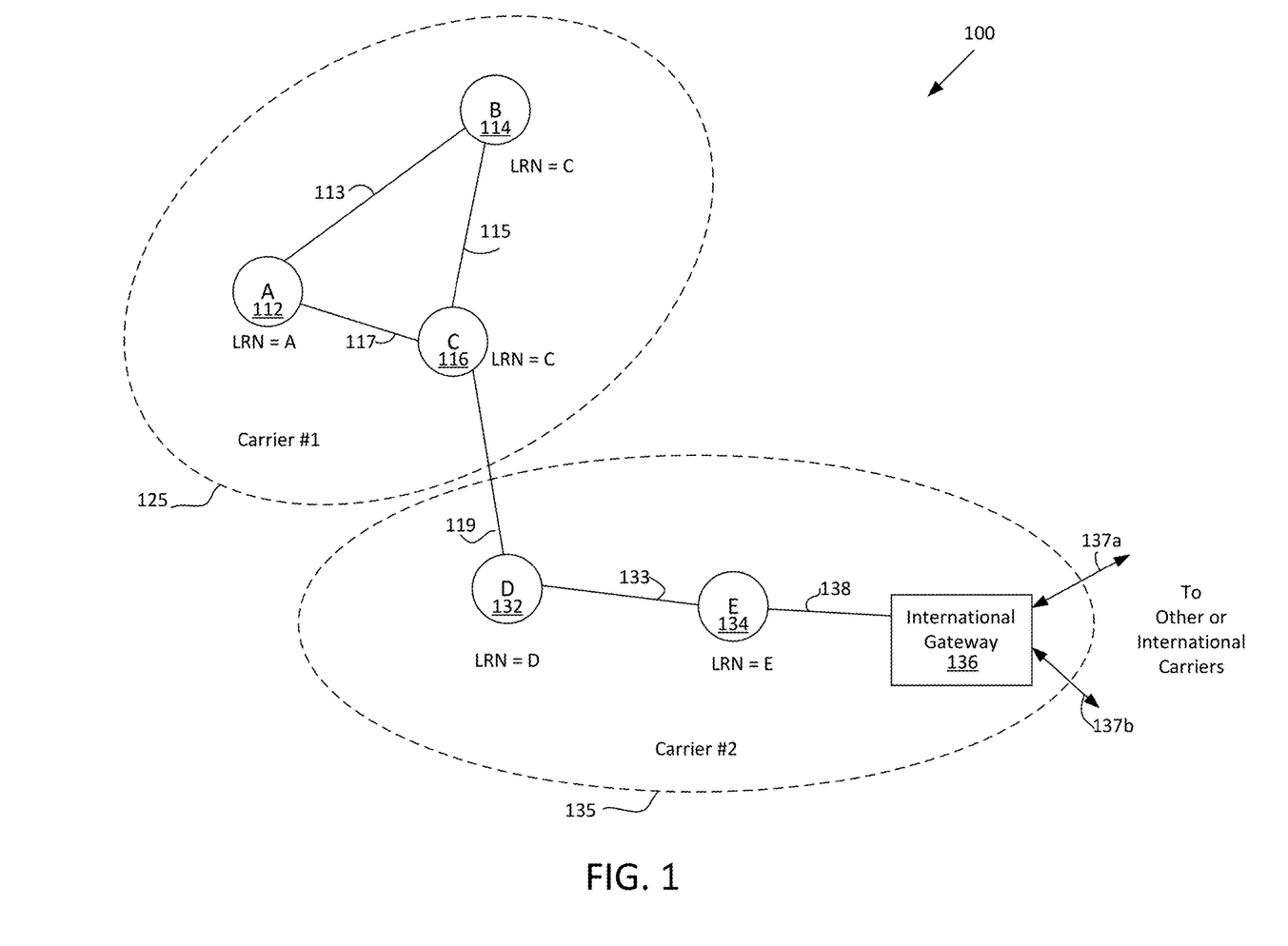
FIG. 1 illustrates one context in which an embodiment of the technologies and concepts disclosed herein may operate.

One embodiment illustrating the context for operation of the present invention is shown in FIG. 1. FIG. 1 shows two separate carriers, Carrier #1 125 and Carrier #2 135. The dotted line reflects that the switch are within the control of each respective carrier. In the case of Carrier #1, there are three switches deployed, Switch A 112, Switch B, 114, and Switch C 116. Each of these switches are directly interconnected to each other via communication facilities 113, 115, and 117, so that any switch can route calls directly to another switch in Carrier #1's network. Thus, there are no non-Carrier #1 switches (or other components) involved in tandem switching/routing, which could potentially strip off digital certificates included in the original call establishment request message from the originating switch to the terminating switch. Consequently, if one switch originates a signed call that includes a digital certificate in the call signaling when the call is routed to the terminating switch. Similarly, Carrier #2 is shown as deploying two switches Switch D 132 and Switch E 134 with associated facilities 119, 133, and 138. An international gateway 136 is shown which may receive or originate calls involving another international carrier over facilities 137a and 137b. Each switch is associated with a respective local routing number, which for convenience is represented by a letter corresponding to the respective switch. Thus, Switch A has a LRN=A. In reality, the LRN is a numerical value, but represented herein as a letter for convenience.

It is expected that different carriers will upgrade their switches to be S/S enabled at different times. Even within a carrier, the switches may be upgraded on a different timeline. This can pose a problem with respect to detecting spoofed calls. For example, consider that Switch B 114 in Carrier #1 is the only switch upgraded to be S/S enabled. Thus, Switch B cannot detect an incoming call from Switch C as to whether the CPN is spoofed or not. There would be no digital certificate included with the call. Similarly, if the incoming call to Switch B originates from another carrier, e.g., Switch D 132, Switch B again cannot detect whether the CPN is spoofed or not. Finally, if the call originated overseas, via the international gateway 136, to Switch E, Switch D, and then to Switch C and onto Switch B, then Switch B could not determine whether the CPN was spoofed or not.

When considering scam robocalls that employ neighbor spoofing, the calls will frequently employ the same NPA-NXX in the calling party number as the called party number and only vary the last four digits. For example, consider when Switch B receives a call directed to 404-555-1111 from a calling number purporting to be 404-555-2222. Knowing just this information, it is unclear to Switch B whether this is a neighbor spoofed call or not. However, Switch B will know that all calls that are not ported having (404) 555 (i.e., the same NPA-NXX) are based in Switch B, which means the calling party number (404-555-222) is served by Switch B. Further, since Switch B signs all calls, then the call from (404) 555-2222 should be signed (even if such calls are not routed out of the switch). Thus, the switch would know that any unsigned call purporting to be from 404-555-xxxx represents a neighbor spoofed call. However, this requires Switch B to know whether the calling party number has been ported out. Once this additional information is known, then a determination can be made as to whether the number is spoofed or not.

Figure 2:
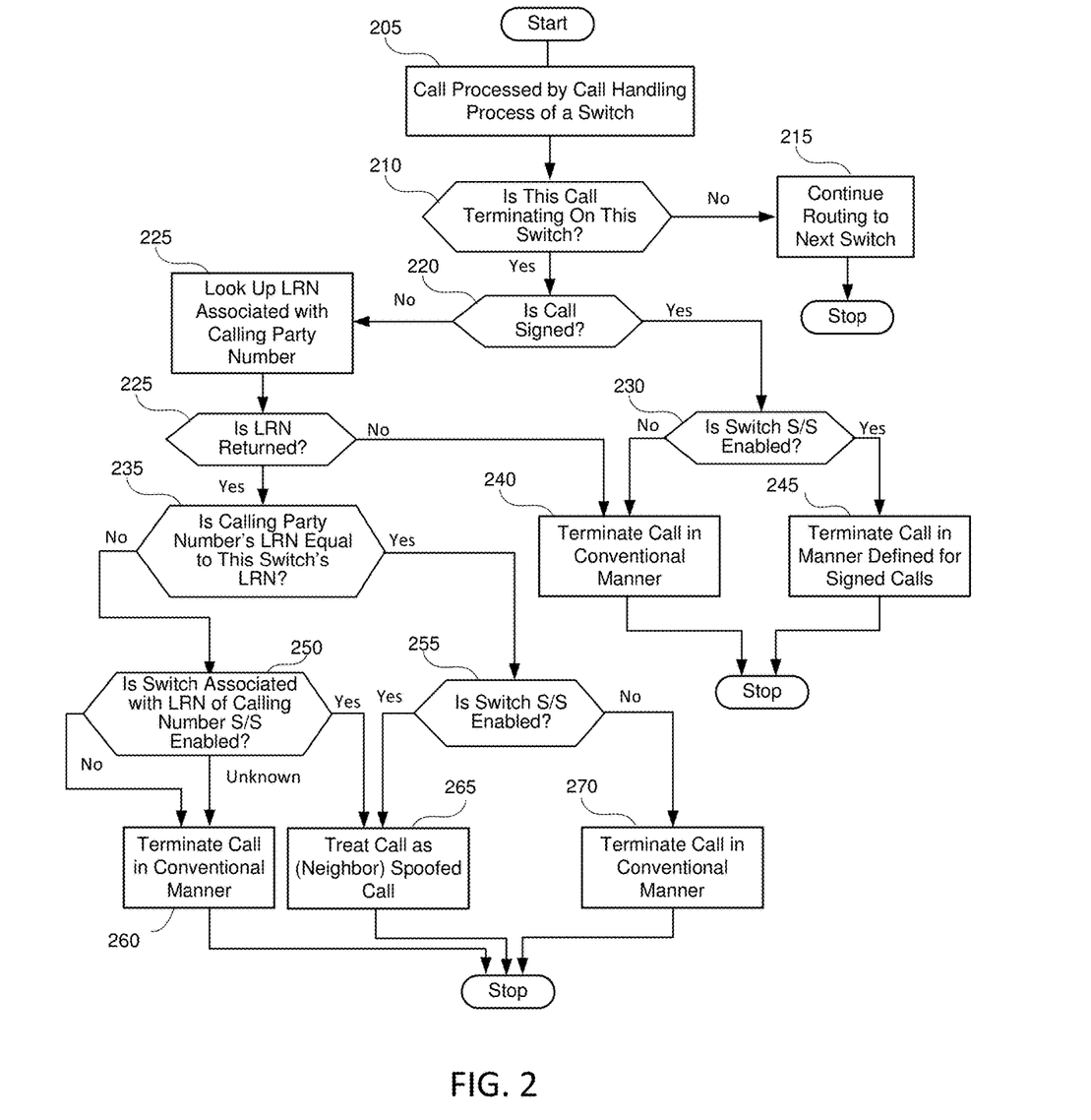
FIG. 2 illustrates one embodiment of a process in a terminating switch to identify a neighbor spoofed call in accordance with the concepts and technologies disclosed herein.

FIG. 2 discloses one embodiment of the process. Those skilled in the art will recognize, in light of this disclosure, the steps illustrated in FIG. 2 may occur in a different order, with slightly different logic, while still accomplishing the overall function of identifying and distinctly processing a neighbor spoofed call. Further, the description of each step describes the operations at a high level, and further processing within each step maybe required as will be known to those skilled in the art in light of the present disclosure.

The process begins at operation 205 with the switch receiving a call requiring processing. Specifically, the switch may receive a call either from an incoming trunk (originating externally to the switch from another switch) or may originate from within the switch itself. In this case, the called party number ("CdPN") reflects a number served by that switch. Regardless of whether the call originated external to the switch or by one of its subscribers, a call handling termination process in the switch performs various well-known functions to determine how the call is to be terminated. This process involves examining the CdPN and/or the LRN. In a number portability context, the LRN informs the switch whether the call is to terminate on that switch or whether the call is to be routed over a trunk or other form of communication facility to another switch. This determination is made in operation 210, by asking whether the call terminates on this switch.

Prior to number portability, this determination could be made by the switch based on analyzing the NPA-NXX portion of the CdPN. The NPA portion is the area code, and the NXX portion is sometimes called the central office or exchange code. Each central office code (the "NXX" portion) within an area code (the "NPA") would be allocated to a switch by a national numbering authority. Those skilled in the art of telephony will recognize a function of the North America Numbering Plan Administrator ("NANPA") is to manage the opening and assignment of central office codes. The switch, upon receiving the incoming call would examine the NPA-NXX to determine whether the call is to be terminated on that switch, or whether the NPA-NXX was assigned to some other switch, indicating that the call should be further routed. If the call is to be routed to another switch, then routing tables stored in the switch could be used to indicate which trunk or communication channel or facility should be used to direct the call to its destination. This process may be repeated by the next switch receiving the call, and hence the call would be processed, hop-by-hop (so to speak) where the intermediate switches route the call until the call reaches the terminating switch serving that number (i.e., the NPA-NXX). The number of tandem switches involved may vary, but typically there would be less than three such tandem switches, if at all. However, in other cases, more may intermediate entities may be involved.

In the era of number portability, the CdPN may not be served by the same switch assigned the NPA-NXX of that CdPN. Whereas prior to number portability, the serving switch could be identified by the NPA-NXX portion of a called number, this cannot be guaranteed in the context of number portability. In the era of number portability, the switch is identified by a local routing number ("LRN"), not the NPA-NXX of the CdPN. Although the LRN may share some format aspects with a telephone number (such as having 10 digits and similar limitations of allowable values), the LRN is not a telephone number. It is a routing number and each switch is assigned a unique value. Specifically, since switches were previously configured to route calls based on the first six digits of the telephone number, the switches (in a number portability context) are configured to route calls based on the first six digits of the LRN. The format of the first six digits of the LRN is also in a format of NPA-NXX, in that the same rules for selecting value NPA-NXX for a telephone number may also apply to the NPA-NXX of the LRN. The last four digits of the LRN may not be significant in routing the call to the destination, and for sake of illustration, the last four digits could simply be set to a default value. To avoid confusion, reference to NPA-NXX refers to the first six digits of a telephone number, whereas the "LRN" is used to refer to the corresponding local routing number. Thus, it is possible for a telephone number (such as (404)-555-1234) to have an LRN equal to 404-555-0000. Thus, it should be clear when referring to, e.g., 404-555 whether a portion of the telephone number is being referenced or an LRN is being referenced. Usually, this will be clear from the context.

If the switch determines in operation 210 that the call is not terminating on the present switch based on the LRN, then the process continues to operation 215, where the call is routed to the next switch, as appropriate. The aforementioned routing tables indicate which switch the call should be routed to, by indicating which communication channel the call should be routed on. Thus, the first two steps are applicable to tandem switching.

If the switch determines based on the LRN that the call is to terminate on that switch in operation 210, then the process continues to operation 220 which determines whether the call is "signed." As noted earlier, this step could occur in a different order than what is shown. A signed call means there is a token or certificate included in the SIP INVITE message, according to the SHAKEN/STIR ("S/S") standard. The certificate reflects whether the calling party number has been authenticated, partially authenticated, or unauthenticated. Other authentication values may be defined. The particular determination is not material, but what is important is that the call originated from a switch which had the capability to sign the call, i.e., it was S/S enabled. The presence of a S/S certificate indicates the originating switch was S/S enabled. That is, the switch was able to process the call origination to indicate an appropriate certificate value.

If the call is signed at operation 220, then a certificate is present, and the process continues to operation 230. At this point, the processing of the call depends on whether the switch is configured to handle signed calls, i.e., whether the switch is S/S enabled. Specifically, a test is made in operation 230 whether the switch enabled to handle the S/S procedures. If the switch is not enabled, then the process continues to operation 240 where the call is terminated in accordance with conventional procedures.

In conventional procedures, the call would be offered to the called party consistent with current conditions and applicable supplementary services. For example, if the called party has voicemail and does not answer, the call may be forwarded to voice mail. If the called party has call forward, or do-not-disturb activated, the appropriate service procedures are invoked.

Because the switch is not S/S enabled and is not configured to act upon signed calls, the switch ignores the additional information that may be present in the SIP INVITE according to existing procedures in operation 240. The process then completes.

If the switch is S/S enabled, i.e., it is enabled to process signed calls in operation 230, then the call is terminated in operation 245 in accordance with defined manner for signed calls. The procedures may vary, and may involve causing various corresponding information to be displayed on the called party's telephone device, whether it be a wireline or wireless phone. This may involve displaying an indication that the number is authenticated (or partially authenticated, or not at all authenticated). The switch may also perform various blocking, routing, or other call handling actions based on the authentication level indicated. This may be a service selected by the called party that use the authentication level as a trigger. For example, the switch may provide the called party a service where fully authenticated calls are offered, partially authenticated calls are routed to voicemail, and unauthenticated calls are blocked or routed to an intercept announcement.

Returning to operation 220, if the call is signed, then the process continues to operation 225. At this point, the LRN associated with the calling party number is determined. This process may involve the switch querying a database or accessing a table stored in memory. Recall that a switch may have to route a call to a called party number and therefore has to look up the LRN for a called party number, so the functionality to launch a query requesting a LRN for a telephone number is likely present in the switch. However, the functionality for launching the query is invoked at this point in the process flow for a terminating call using the calling party number, which is not known in the art.

The query may return a LRN different from the NPA-NXX of the calling party number in operation 225. This indicates that the calling party telephone number has been likely ported to another switch. If a LRN is returned that reflects the same NPA-NXX value of the calling party number, then that reflects the calling party is likely based on the switch originally assigned that NPA-NXX, i.e., the number is not ported. It is also possible that no LRN is returned, which may reflect that the number is not ported, or some other technical issue with providing the LRN. If no LRN is returned in operation 225, then the process continues to operation 240 where the call is terminated in a conventional manner. If no LRN is returned, and because the call is not signed, it is possible that the calling party number may be spoofed, and specifically neighbor spoofing is present. In other words, insufficient information is available to determine the call should be terminated in a unique manner. The process shown in operation 240 may still apply various analytics based processing to label or block the call or provide further information to the called party.

Assuming that a LRN is returned from operation 225, the process continues to operation 235, where a test is made to determine if the LRN of the calling party number is equal to the LRN of the present switch or it the LRN reflects the present switch is the terminating switch. If the LRN is equal to that of the present switch, then that means either the calling party number was originally assigned to the present switch or if the number was ported, then the number was ported to the present switch. The process then continues to operation 255 where a determination as to how to proceed depends on whether the switch is S/S enabled. If the switch is not S/S enabled, then the process continues to operation 270 where the call is terminated in a conventional manner. This flow represents a call that was unsigned (from operation 220), which is received from a calling party number associated with the present switch, but which switch is not S/S enabled. Thus, the call is unsigned, consistent with the switch not being S/S enabled. The call is terminated in a conventional manner, which may include application of various analytics based labeling or blocking actions.

If, however, the present switch is S/S enabled in operation 255, then an inconsistency has occurred. Recall that in operation 220 it was determined the call was unsigned, but in operation 235 it was determined the calling number's LRN is associated with the present switch, which is S/S enabled. Thus, the call should have been signed when originated. That it did not get signed suggests that the calling party number was spoofed and did not originate on the S/S enabled switch. If the calling party number was spoofed, and further if it was neighbor spoofed, then the NPA-NXX of the calling party number would be associated with that switch. In other words, if the originating switch was able to sign calls, but in this case the call is not signed, this suggests that neighbor spoofing is involved. The call is then treated in operation 265 as a neighbor spoofed call. The termination treatment may involve, e.g., routing the call to an intercept announcement, routing the call to voice mail service, blocking the call, rejecting the call by returning a specific cause code, providing busy treatment to the caller, further interacting with the caller via an IVR, etc. The process is then completed.

If the calling party number's LRN is not equal to the present switch in operation 235, then the switch may be able to determine in operation 250 whether the LRN of the calling party number corresponds to an S/S enabled switch. For example, a carrier may have enabled 75% of their switches to sign calls, and may have this information maintained in each switch. For example, in the prior diagram Carrier #1 may have enable three of the four switches. Specifically, each switch in that carrier's network maintains a table of the LRNs assigned to that carrier which are S/S enabled. Thus, any switch in that carrier's network receiving the present call is able to determine whether the LRN of the calling party number is within that carrier's set of S/S enabled switches. The present switch would then know to expect that the call received should have been signed, since it if originated on an S/S enabled switch as purposed, then that switch would have signed the call. If unsigned, this suggests the number was spoofed and did not actually originate on the switch associated with the LRN as purported.

Thus, in operation 250 if the present switch knows the LRN of the calling party number is an S/S enabled switch, then it may continue to operation 265 and treat that call as a spoofed call. In this case, the calling party number is spoofed, but because it did not originate with the LRN of the present switch, it is not a neighbor spoofed call. On the other hand, at operation 250 if the LRN of the calling party number is known to be a switch that is not S/S enabled, or if the status is unknown, then the call can be terminated in a conventional manner in operation 260. Again, analytics may be involved to determine a label, block the call, or perform other treatment known in the art. Regardless of the application of the above processes, processes used to label or block the call on analytics can be employed.

This process flow in FIG. 2 can be altered to operate in a different order, and accomplish the same result. For example, the test in operation 230 and 255 (Is Switch S/S Enabled?") could occur initially, so that this determination is made earlier in the process once. The process flow shown reflects that a present S/S enabled switch receiving a call can determine based on the calling party number whether that call originated from that switch. If the switch is able to sign calls, then the call it originated should be signed. The absence of a signed call purportedly originating from the same switch configured to sign calls suggests neighbor spoofing. If the call purportedly originated from another switch known to be able to sign calls, then the absence of the call being signed suggests conventional or a larger scope of neighbor spoofing. In either case, appropriate procedures can be defined to handle the two situations as desired.

Network Evolution

If a carrier deploys S/S on single switch, then that switch will be able to detect neighbor spoofing on incoming calls indicating a calling party number assigned to that switch. If the carrier deploys S/S on more than one switch in their network, and the switches are interconnected directly, then the carrier knows that a signed originated call from one switch will be properly transmitted to the other switch. (That is, the carrier will know that there are no intermediate non-compliant tandem switches that will strip off the certificates as the call is routed.) Thus, the one configured switch will be able to stop neighbor spoofing for subscribers served on that switch, as well as stopping conventional spoofed calls purporting to originate from numbers associated with the other switches in that carrier's network. As the carrier deploys more and more S/S enabled switches, the carrier will be able to stop more and more spoofing for calls purporting to originate from one of the carrier's switches. The carrier will know which calls originated and terminated at an S/S enabled switch controlled by the carrier. If network capabilities are added to allow a carrier to know about other carrier's switch capabilities, then the scope of protection can be enlarged.

By allowing the terminating switch to look up whether the originating switch was S/S enabled or not, the terminating switch is better able to evaluate whether the call is spoofed or not. The S/S architecture was designed based on the presumption that the entire ecosystem was S/S enabled. Those calls coming in from outside the carrier, or outside a country, would be received at an international gateway wherein if no certificate was presented, the S/S enabled gateway could add information indicating the call was not attested to. This scheme allowed carriers to distinguish those calls which originated from switches or carriers unable to sign calls. The present scheme allows carriers who are more aggressive in their S/S deployment in their switches to realize the benefits and provide better services to their subscribers without being hindered by other carriers that are not as timely in their deployment.

Carrier Limitations

Figure 3:
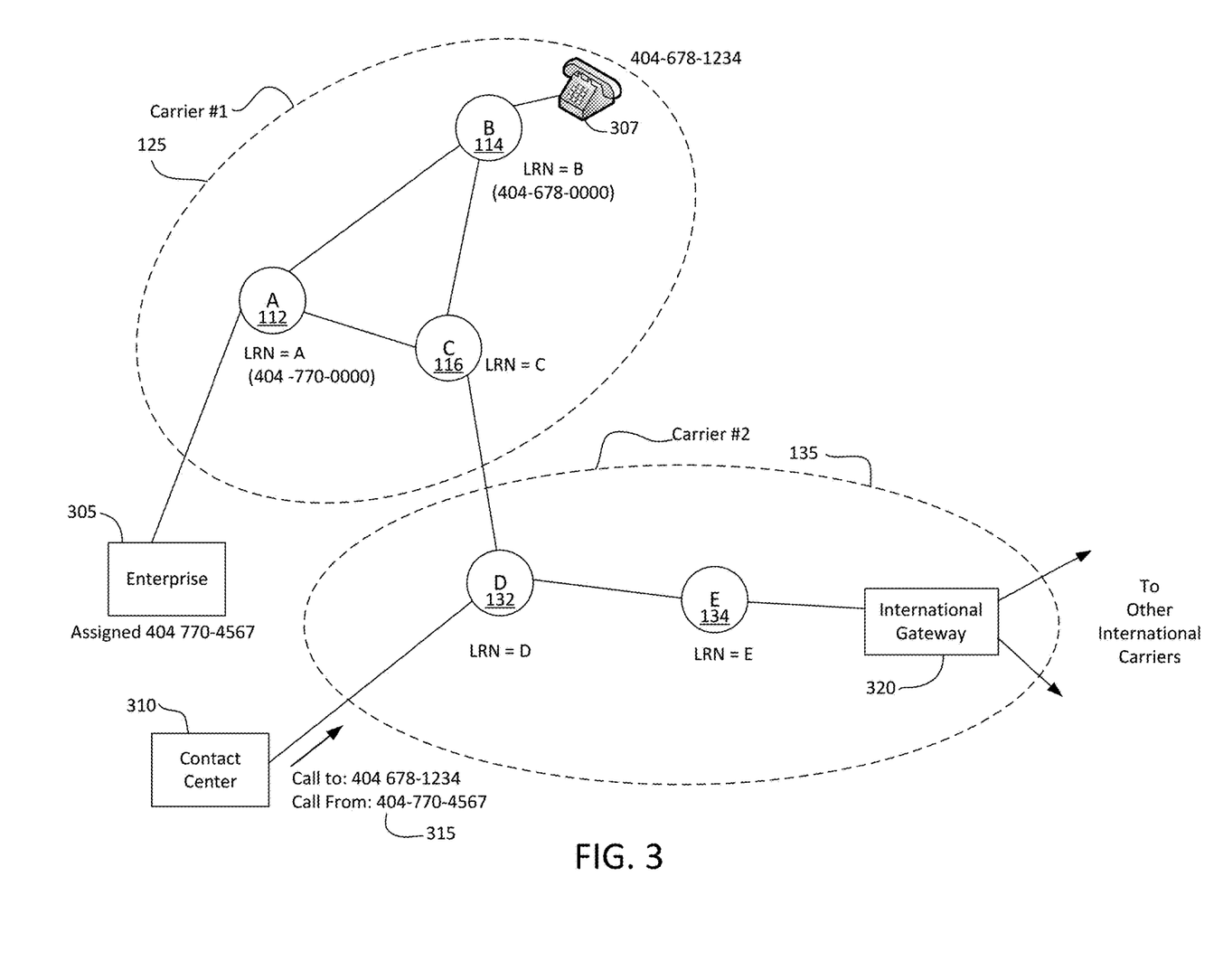
FIG. 3 illustrates another context in which originated spoofed calls may be identified.

The deployment of the above neighbor spoofing detection scheme limits the ability to utilize certain types of authorized spoofing from non-S/S enabled switches for calls originating in other carriers. This situation can be illustrated using FIG. 3. Turning to FIG. 3, an enterprise 305 may outsource certain outbound calls to be made by a contact center 310. The contact center 310 is connected to a different carrier (Carrier #2 135) as compared to the enterprise, which uses Carrier #1 125. Further, consider that the contact center is to originate a call 315 to a customer 407 of the enterprise, located at telephone number (404) 678-1234. That customer 407 is a subscriber of Carrier #1. Thus, the call path may be from the contact center 310 to Switch D 132 to Switch C 116 and then to Switch B, 114 where the call is then offered to the called party 407. Further, the contact center is authorized to spoof the telephone number of the enterprise, (404) 770-4567. Thus, the call offered to Switch D 132 uses the calling party number of (404) 770-4567 and the called party number of (404) 678-1234.

For purposes of illustration, assume that Switch D 132 is not S/S enabled. Thus, the called will be received and routed by Switch D without any digital signature or certificate information added. Switch D will route the call to Switch C. In one embodiment, assume that Switch C is also not S/S enabled. Thus, the call will come into Switch B as a conventional (i.e., non-signed) call with the calling party number=(404) 770-4567.

Switch B is presumed to be enabled for S/S, and will recognize that no certificate information is present. Further, Switch B may know that the calling party number is associated with the LRN of Switch A, which is 404-770-0000. If Switch A is S/S enabled, then presumably Switch B will know of this, as this could be implemented using a simple table lookup as described previously. Switch B would know that calls originating from Switch A would be normally signed in contrast to the present call that is not signed. Therefore, Switch B knows the call did not originate at Switch A as suggested by the calling party number, but the call itself indicates a calling party number with an NPA-NXX associated with the LRN of Switch A (assuming the calling party number was not ported). Therefore, Switch B knows the calling party number is spoofed. The question is whether the spoofing is authorized or not. Since Switch B is not aware of whether the spoofing is authorized or not, Switch B could provide spoofing treatment to the call based on the assumption it is unauthorized.

The spoofing treatment provided may vary. In one embodiment, the call could be offered to the called party with a label included, reflecting that the number is spoofed, but it is unknown as to whether it is an unauthorized spoofed call. In another embodiment, the call could be unconditionally routed to voice mail, an intercept, or an IVR which requires further calling party interaction, before being redirected back to the called party. If the call is not offered to the called party, the caller party could be informed of the existence of the call via a notification, such as a voicemail waiting notification (if the caller was routed to voicemail and left a message) or some other message based notification (e.g., SMS, email, or a call with a pre-recorded message) informing the called party that the call was received and processed in a certain manner.

Had the call originated at Switch A of Carrier #1, or any other switch in Carrier #1's network that was S/S enabled, then Switch B would have expected a S/S certificate, which would have indicated the calling party number was authenticated in some manner, indicating it at least originated from a S/S enabled switch. But without knowing further information as to the call, Switch B can only provide spoofing call termination treatment based on the assumption that the call was based on an unauthorized spoofed number.

In another potential embodiment, the contact center could have communication interfaces to Switch A of Carrier #1 which are used to originate calls to subscribers of Carrier #1. In such case, the contact center can coordinate to have originating calls using the calling party number (404) 770-4567 to be partially or fully authenticated by the switch receiving the call in Carrier #1. Thus, such calls when terminated at Switch B would not receive the default spoofed call treatment, as they would arrive with a S/S certificate.

In another potential embodiment, the contact center could originate call using a number associated with Switch D or Carrier #2, which has been assigned by Carrier #2 to the contact center. Essentially, the contact center would originate a call on behalf of the enterprise without spoofing the enterprise's number. Rather, the contact center would be using a number assigned to the contact center by its carrier. In such cases, the call would be routed from Switch D to Switch C, then to Switch B, and would be treated as a conventional non-S/S signed call. Terminating Switch B would then be unable to ascertain whether the number was spoofed or not. (For example, Switch B may know that the LRN of the calling party number is associated with Carrier #2, but likely does not know if the switch in Carrier #2 receiving that call is S/S enabled.) In this case, Switch B would likely default to treating the call as a legitimate, non-spoofed, non-signed call. In such cases, Switch B may still provide analytics based labeling or blocking. Thus, if there is presently a large scale spoofing campaign from a scammer that happens to use that same calling party number as assigned to the contact center, then Switch B may process incoming calls using that calling party using existing analytics-based call labeling techniques.

However, as Carrier #2 upgrades their switches, e.g., they add S/S capability to Switch D, then calls originated by Switch D will be signed. Specifically, calls originating from the contact center will be signed, and the attestation will likely reflect that the number is attested to or partially attested to. Then, the signed call would be routed from Switch D, to Switch C, and then to Switch B, at which point the conventional S/S procedures would be applied.

Thus, as the above process is deployed by more and more switches in carriers, the adverse impact on authorized spoofing decreases. Further, as more and more switches are S/S enabled, unauthorized spoofed calls will be detected at their point of origination. A contact center served by a non-S/S enabled switch (i.e., Switch D) may have to suspend their use of authorized spoofing for calls originated on behalf of the enterprise for a time period until the carrier's serving switch (i.e., Switch D) is enabled to sign calls. Once the service switch is S/S enabled, then authorized spoofing can occur. For some contact centers that do not spoof, then this should not adversely impact them.

In another embodiment, a national database could be defined that indicates for each LRN, whether the corresponding switch is S/S enabled. This information could be returned when querying the LRN for a calling party number, and would indicate to the switch whether the call originated at a S/S enabled switch. This would allow the switch terminating the call to know whether the call should have been signed, and if not, this suggests the number was spoofed. There is the possibility that tandem routing switches could have stripped off the certification information, and calls could be inadvertently incorrectly treated as spoofed, when they were not. However, using a national database to indicate whether the corresponding switch was S/S enabled would facilitate a large scale, inter-carrier deployment detecting unauthorized neighbor spoofing.

Calling Party Notification

It is advantageous that the originator of the call, i.e., the contact center, know the outcome of the call. In some networks, calls that are deemed to be an illegal call or a robocall are provided with busy treatment. These network may provide the caller with a false busy, which does not reflect the actual outcome of the call. It is preferable that the call originator know the why the call was not offered to the called party as intended.

If the call at the terminating switch is routed to an intercept, the message provided by the intercept could provide an audible message indicating why the intercept is being provided. The intercept could be, for example, "This call has been deemed to be employing an unauthorized spoofed calling party number. Contact XYZ carrier customer service at 800-555-1212 for further information." The cause code (a.k.a. as a SIP response code) returned in the call rejection message could be a value indicating the call was rejected. For example, SIP response code 607 could be returned indicating an unwanted calls. Further information about this proposal can be found in Internet Engineering Task Force ("IETF") Request for Comments ("RFC") 8197. Other code values could be used, provided it provides a non-misleading indication of why the call was not offered as normal.

If the call at the terminating switch routes the call to an IVR or voice mail system, the call will be offered and answered, and the IVR or voice mail system could provide an initial greeting or announcement that can provide useful information to the calling party. In the case of an IVR, the calling party may be prompted to enter information to ascertain that a live person is connected. For example, the IVR may prompt the calling party to enter a specific keypad sequence, such as a stated value or the current date. If the call was originated by a computer configured to play an announcement (e.g., a so-called robocall), then prompting for keypad information will be ignored by the calling party. The IVR could then proceed on the assumption the call is a robocall or some other type of call. In some instances, the IVR would terminate the call. If however, a proper response is received at the IVR in response to a prompt, the IVR can then assume that the calling party involves a live person, and the call could be processed accordingly. For example, the calling party may be asked to leave a voice mail message or IVR could cause the call to be re-attempted again to the called party, but with the assumption the call is not based on a spoofed number.

Impact to Analytics Call Labeling Procedures

Analytics based call labeling, as those skilled in the art know, involves examining call related information, including the calling and called party number, along with other contextual information, and applying an algorithm to score the likelihood that the call is of a certain type. Based on the score in various categories, the value of the label may be determined. The label is text-based information, potentially including a graphic or icon, which conveys information to the called party indicating aspects of the call, including the type or purpose of the call. The values indicated may vary by service provider, but some common label values include, e.g., "informational", "telemarketing", "account servicing", or more general categories such as "robocall", "scam", or "spam." Thus, the called party on a mobile phone, or a landline with a suitable display device, can be presented information about the call prior to answering the call.

Analytics based call labeling has not been able to detect and report with great certainty whether the call involves a spoofed number. Typically, many illegal calls, such as "scam" type calls may spoof a number, and the analytics process may recognize and identify such calls by the number spoofed, but the analytics process is not intrinsically able to determine with certainty whether the number is spoofed or not. In the case of neighbor spoofing, it is more difficult for the analytics engine to determine whether the calling party number is spoofed, or whether it is actually a "neighbor" number or some other local person originating the call. Part of the difficulty is that the CPN used in neighbor spoofing may be used for only a few calls (or a single call) and changed to mirror that of for the next call. Thus, it is difficult to establish a definitive pattern in order to properly label such calls. Even if there are sufficient number of calls to establish a pattern, the initial calls (when the number is first spoofed) may be incorrectly labeled prior to determining a pattern. Further when the spoofing stops, it is possible that legitimate calls from callers using that value may be incorrectly labeled because the pattern is still thought to exist.

However, the analytics process could be made more accurate using the concepts and technologies herein. This requires expanding the analytics process to evaluate the LRN of the calling party number, along with information of whether the originating switch was S/S enabled, and whether the call was signed when received at the terminating switch. This can provide useful information to ascertain whether the calling party number was spoofed or not. In some embodiments, this knowledge can potentially overwrite or supplement existing label information provided to the called party.

Figure 4:
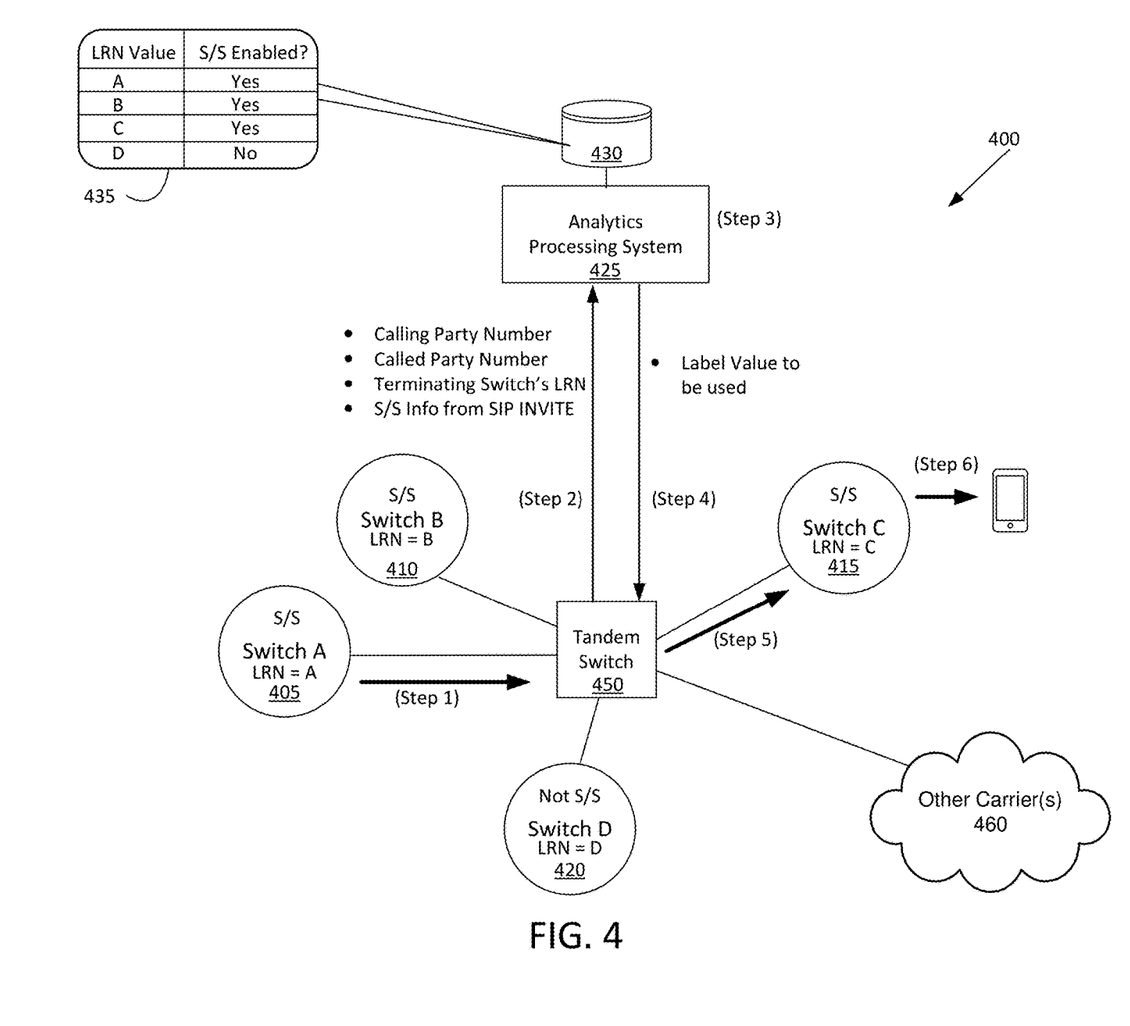
FIG. 4 shows one embodiment of a system for determining the label of a call using a spoofed number in accordance with the concepts and technologies disclosed herein.

Turning to FIG. 4, one architectural embodiment is illustrated. In this embodiment, a carrier has four switches, Switch A 405, Switch B 410, Switch C 415, and Switch D 420. These switches could be class 5 end offices for wireline subscribers or mobile telephone switching offices (MTSOs) for wireless carriers. Three switches (Switches A, B, and C) have been upgraded and are able to sign calls, e.g., they are S/S enabled. The fourth switch, Switch D, is not S/S enabled. Thus, any call between Switches A, B, and C will be signed at their origination switch and detected as being signed at the terminating switch. However, when Switch D originates a call, it will be unsigned. In that respect, calls from Switch D cannot be verified any more than calls from other carriers. Further, in this deployment, a tandem switch 450 is deployed to route calls between the switches of that carrier, as well as receive incoming calls from external carriers. The tandem switch is presumed to pass the digital certificate information in calls, such the S/S information is not lost. Although the tandem switch 450 may not be deployed as a distinct entity, the functionality may be incorporated into one of the other switches. However, it is illustrated as an external and distinct entity to facilitate illustration of the concepts.

The tandem switch 450 processes every inter-switch call, and upon receiving the incoming request, it will initiate a query to an analytics system 425. In FIG. 4, this is shown as a call originating from Switch A 405 in step 1 as a call routed to the tandem switch 450. Then the tandem switch originates a query in step 2 to the analytics processing system 425. There, the analytics processing system receives the query, which includes the calling party number ("CPN"), the called party number ("CdPN"), the LRN (of the destination, e.g., associated to route the call to the appropriate switch serving the CdPN), and information related to the S/S information conveyed in the SIP INVITE message.

The analytics processing system then performs step 3, which is to determine a label to associate with the call. Various analytics providers may utilize various algorithms to ascertain the nature of the call. However, they have not yet considered the S/S information in the SIP INVITE. The information made available to the analytics process could be as extensive as including all of the S/S information in the SIP INVITE or as little as merely providing an indication of whether the call was signed or not.

The analytics processing system may access a database 430 or other memory store that stores a table 435 of the various LRNs. This could be a limited table for only the LRNs controlled by that carrier or in other embodiments, could have LRN information for other carriers' switches. In this case, as the carrier has four switches (Switches A, B, C, and D) and consequently only four LRNs are shown in the table. In other embodiments, the table may be a national or regional table that includes LRN values not only of the present carrier, but other carriers. It may be a nationally-managed database, which fields queries from the analytics processing system. The table 435 provides information as to whether each switching entity associated with that LRN is able to sign calls, i.e., whether that switch S/S enabled. In this table, it reflects that LRN A, B, and C (associated with Switch A, B, and C) are S/S enabled, and LRN D (associated with Switch D), is not yet S/S enabled. This table could be managed and updated by the carrier, or by a third party service provider. It could be accessed by other analytics processing system providers, as well.

The analytics processing system ascertains the LRN for the calling party number. This may be via another table lookup (not shown). Once the LRN is known, then it can be determined if that switch, which the calling telephone number purportedly originated from, is S/S enabled using table 435. In this example, because the call originated from Switch A, which is S/S enabled, the analytics processing system knows that Switch A would have signed the call. The analytics processing system also knows from the information in the query, whether the call was signed. The analytics processing system may also know the attestation information, if the call was signed. Presumably, in this case, the calling party number would have been fully attested by Switch A, and the analytics processing system would know that information. If not, the analytics processing system would know that Switch A was enabled to sign calls, and that because the call is signed, it is presumable properly attested. The analytics processing system in step 4 could then return an appropriate label value to the tandem switch (or the terminating switch), which is conveyed along with the call in step 6, and then indicated to the called party when offering the call in step. The label value, could indicate, for example, "trusted caller", or "trusted calling party number."

If the call had originated from, e.g., Switch D, using a number based in Switch D, the process would be similar, but the analytics processing system would not have been provided with any S/S information, and would know that Switch D has not been enabled yet to sign calls. Thus, the analytics processing system could assign a label as appropriate. The analytics system, however, cannot accurately ascertain whether the number is spoofed or not.

Similarly, if a call comes in from another carrier 460 using a number that is not based in Switch A, B, or C, then the analytics processing system cannot accurately tell whether the number is spoofed. However, if a call from outside the present carrier (e.g., from one of the other carriers 460) is received, which attempts to neighbor spoof the mobile subscriber using a number based in Switch C, then the analytics processing system will know the number is spoofed. The analytics processing system will lookup the LRN of the calling party number, which is would be the same LRN as Switch C. The analytics system will know that Switch C is S/S enabled, and that the absence of a digital certificate means that the call did not originate on Switch C. Therefore it is spoofed. The analytics systems can then label the call appropriately. Further, it is evident that this condition can be detected if the incoming call from the other carrier spoofs a number based in Switch A or Switch B. It cannot be detected if the call originates spoofing a number based on Switch D.

Of course, this deficiency could be addressed if the SIP INVITE information includes information identifying which switch originated the call, which could be used by the analytics provider to ascertain whether that switch is S/S enabled or not. However, because the originating switch information could be spoofed, this solution could be compromised as well by spoofing a different switch identifier. It could be made difficult to compromise and unlikely to occur, but a better solution would be to merely upgrade Switch D to be S/S enabled.

Figure 5:
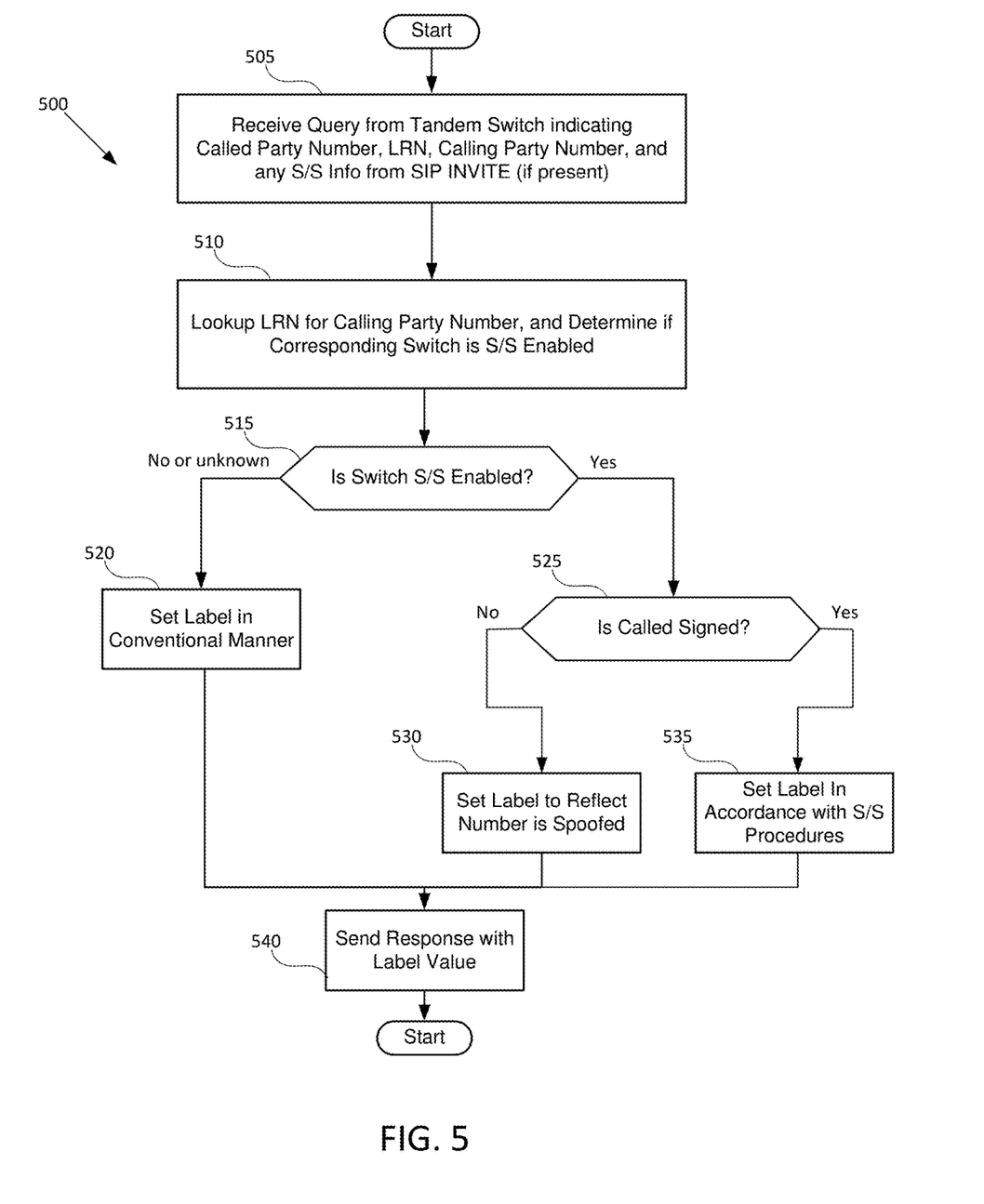
FIG. 5 shows one embodiment of a process flow for determining the label of a call using a spoofed number in accordance with the concepts and technologies disclosed herein.

Turning to FIG. 5, a process flow illustrates how the analytics systems can ascertain whether the call is a neighbor spoofed call or not. The process begins with receiving the query in operation 505. In this operation, the query includes the CPN, the CdPN, the LRN (again, of the terminating switch), and S/S information. As noted earlier, the amount of S/S information provided may vary, but include at least an indication of whether the call was signed or not.

Then, the analytics system determines based on the LRN of the CPN and whether that switch is S/S enabled in operation 510. If the originating switch purportedly identified by the CPN is S/S enabled, then the process continues to operation 525. If the call is signed (which is expected), then the process continues to operation 535 where the label is set or determined in accordance with the S/S information. The number is presumed to be as indicated in the S/S attestation level. If the call is not signed in operation 525, then this condition reflects an anomaly, and the label is set to reflect that the CPN is spoofed. The label, as determined, is then sent to be processed in operation 540 in conjunction with delivering the call to the called party.

Returning to operation 515, the switch may be known as not being S/S enabled, or there may no LRN identified to determine this. For example, in FIG. 4, the analytics provider knows the LRN of all four switches of the carrier it serves, but does not know the LRN of switches from other carriers. If the LRN table is expanded to allow information from other carriers to be accessed or stored, then this would be known. If the LRN table is not expanded, then the LRN may not be in the table. In either case, it cannot be accurately determined whether the number was spoofed or not. The label may be set in accordance with conventional practices in operation 520.

It becomes evident that if the carrier only upgrades Switch A to be S/S enabled, then subscribers on that switch can be protected from neighbor spoofing for CPNs purporting to originate from that switch. As the carrier upgrades another switch in their network, e.g., Switch B, then subscribers on both switches are protected from neighbor spoofing. Further, they are protected from neighbor spoofing where the number purportedly originates from either Switch A or Switch B. Then as Switch C is upgraded to be S/S enabled, then scope expands to protect more subscriber and a wider scope of neighbor spoofing. Finally, when all the switches are upgraded, then all the subscribers of that carrier in that area are protected from neighbor spoofing.

Scammers may find that that neighbor spoofing becomes less effective when these concepts and technologies are employed. To an extent, scammers have found that neighbor spoofing using the same NPA-NXX in the calling as the called number is now recognized by called parties as neighbor spoofing. As a result, some scammers are using other NxX values within the same NPA. The above approach can be effective in addressing such calls. If scammers resort to using a completely different NPA, then a LRN table 435 having a large scope may address this problem.

While carriers are in the process of upgrading and transitioning their switches, this approach can be effective in addressing neighbor spoofing while networks are being udpated. It is based on knowing that a number purportedly originating from a switch that was S/S enabled should be signed. If not signed, it is a spoofed call. As more and more switches are upgraded, the need to detect neighbor spoofing in this manner may diminish as signed calls will be more prevalent, and greater reliance can be given to using the S/S procedures to determine the trustworthiness of the call.

Exemplary Processing Device Architecture

Figure 6:
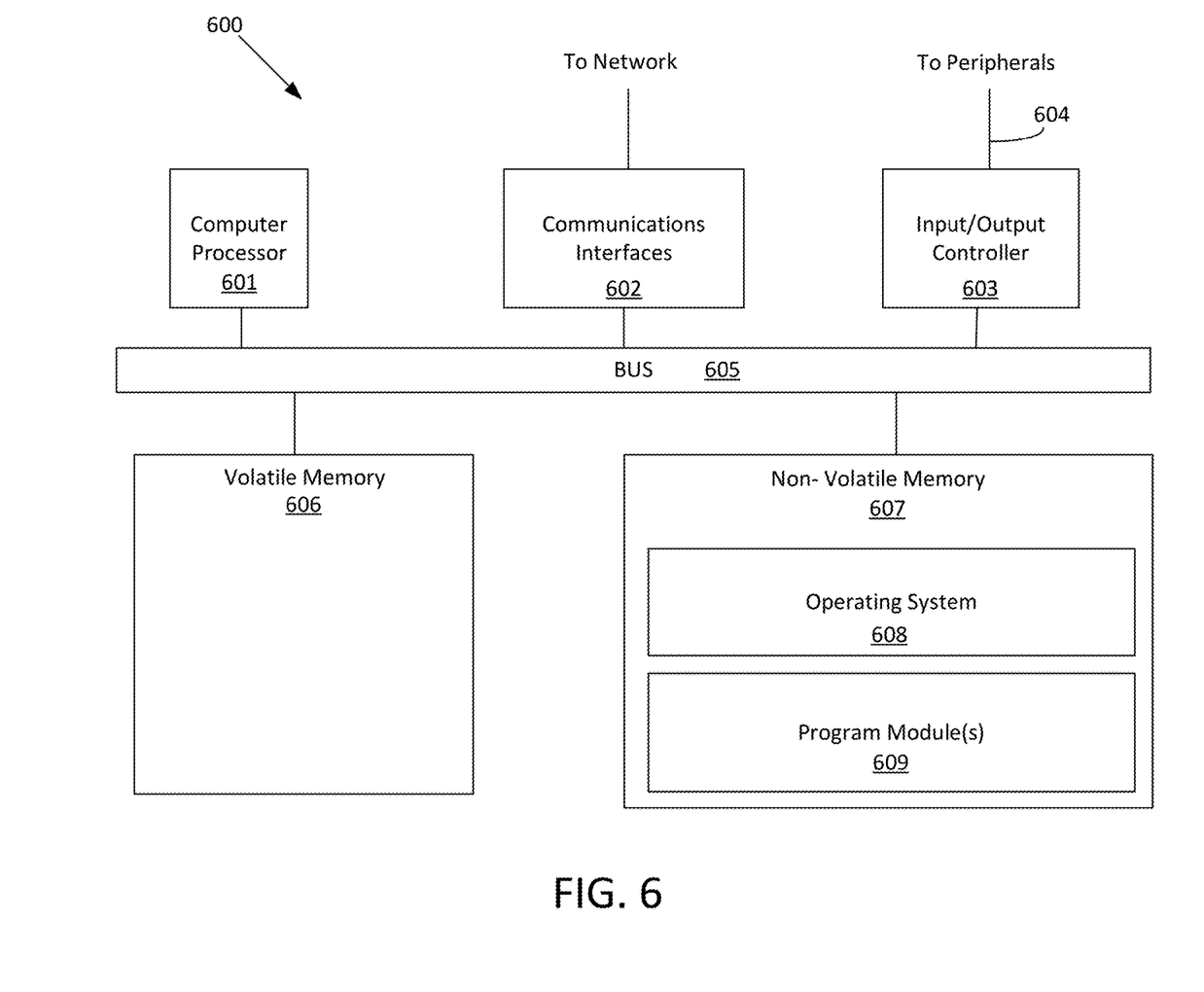
FIG. 6 illustrates an embodiment of a processing device for practicing various technologies and concepts disclosed herein.

FIG. 6 is an exemplary schematic diagram of a processing component 600 that may be used in various embodiments of VoIP switches and or analytics processing systems that could practice the technologies disclosed herein. This includes, such as, a wireline switch (functioning as e.g., a Class 5 end office), a wireless switch (i.e., a mobile telephone switched office or MSTO), etc. In general, the term "computer processing component" may be exemplified by, for example, but without limitation: various types of computers, servers, blades, gateways, switches, and the like, as well as any combination of devices or entities adapted to perform the functions described herein.

As shown in FIG. 6, the computer processing component 600 may include one or more computer processors 601 that may communicate with other elements within the processing component 600 via a bus 605. The computer processor 601 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the computer processing component 600 may also include one or more communication interfaces 602 for communicating data via the local network with various external devices. Depending on the embodiment, communication may be via wired, optical, or wireless networks (or a combination thereof). The communication may use a variety of data transmission protocols, such as fiber distributed data interface (FDDI), Ethernet, asynchronous transfer mode ("ATM"), or frame relay. A variety of signaling protocols may be used, such as those associated with SIP.

The computer processing component 600 may further include an input/output controller 603 that may communicate with one or more input devices or peripherals using an interface 604, such as, but not limited to: a keyboard, a mouse, a touch screen/display input, microphone, pointing device, etc. The input/output controller 603 may also communicate with output devices or peripherals, such as displays, printers, speakers, headsets, banner displays, etc.

The computer processor 601 may be configured to execute instructions stored in volatile memory 606, non-volatile memory 607, or other forms of computer-readable storage media accessible to the processor 601. The volatile memory 606 may comprise various types of memory technologies, including, but not limited to: random access memory ("RAM"), dynamic random access memory ("DRAM"), static random access memory ("SRAM"), and other forms well known to those skilled in the art. The non-volatile memory 607 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 607 may store program code and data, which also may be loaded into the volatile memory 606 at execution time. Specifically, the non-volatile memory 607 may store one or more program or application modules 609 to perform the above described processes and/or functions associated with the technologies disclosed herein, and/or operating system code 608. In addition, these program modules 609 may also access, generate, or store data 610, in the non-volatile memory 607, as well as in the volatile memory 606. The volatile memory 606 and/or non-volatile memory 607 may be used to store other information including, but not limited to: records, applications, programs, scripts, source code, object code, byte code, compiled code, interpreted code, machine code, executable instructions, or the like. These may be executed or processed by, for example, the computer processor 601 and/or may form a part of, or may interact with, the program modules 609.

The technologies described herein may be implemented in various ways, including as computer program products comprising memory storing instructions causing a computer processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-Ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

Further, those of ordinary skill in the art can envision other applications of various embodiments of the invention disclosed herein in addition to applications in a contact center environment in light of this disclosure. For example, applications of various embodiments of the invention may be used in a library environment having electronic materials such as recordings and books wherein individuals are conducting some type of analytics on the electronic materials to identify materials of interest. Therefore, it should be understood that various embodiments of the invention may be used in other environments besides a contact center.

The invention claimed is:

1. A non-transitory computer readable medium comprising instructions that when executed by one or more computer processors for a VoIP switch, cause the one or more computer processors to:
  process a call for termination in the VoIP switch, wherein the call is signaled by a Session Initiation Protocol ("SIP") INVITE message at the VoIP switch directed to a called party number ("CdPN"), wherein the VoIP switch is configured to generate digital certificates authenticating calling party numbers for outbound call originations;
  determine a calling party number ("CPN") of the call;
  determine the call does not include a digital certificate in the SIP INVITE message;

determine a local routing number ("LRN") associated with the CPN;

determine the LRN is associated with a SHAKEN/STIR ("S/S") enabled VoIP switch; and provide call termination treatment to the call based on determining the LRN is associated with the S/S enabled VoIP switch in conjunction with the call not including the digital certificate in the SIP INVITE message.

2. The non-transitory computer readable medium of claim 1, wherein the call termination treatment comprises providing an intercept announcement to a caller.

3. The non-transitory computer readable medium of claim 1, wherein the call termination treatment comprises terminating the call to a voice mail service associated with the CdPN.

4. The non-transitory computer readable medium of claim 1, wherein the call termination treatment comprises associating a label for presentation to a called party in conjunction with offering the call to the CdPN.

5. The non-transitory computer readable medium of claim 4, wherein the CdPN is a wireless number and the label indicates to a user of a mobile phone the calling party number is spoofed.

6. The non-transitory computer readable medium of claim 1, wherein the S/S enabled VoIP switch is the VoIP switch.

7. The non-transitory computer readable medium of claim 1, wherein the S/S enabled VoIP switch is different from the VoIP switch.

8. A voice over Internet Protocol ("VoIP") switch configured to:

process a voice call comprising a Session Initiation Protocol ("SIP") INVITE message directed to a called party number ("CdPN") at the VoIP switch for termination, wherein the VoIP switch is configured to validate digital certificates authenticating calling party numbers in inbound SIP INVITE messages;

determine a calling party number ("CPN") of the voice call;

determine the voice call does not include a digital certificate in the SIP INVITE message;

determine a local routing number ("LRN") associated with the CPN;

determine the LRN is associated with a S/S enabled VoIP switch; and provide call termination treatment for the voice call based on determining both the LRN is associated with a SHAKEN/STIR ("S/S") enabled VoIP switch and the SIP INVITE message does not include the digital certificate.

9. The VoIP switch of claim 8, wherein the S/S enabled VoIP switch is the VoIP switch.

10. The VoIP switch of claim 8, wherein the call termination treatment comprises terminating the voice call and providing an intercept announcement to a caller.

11. The VoIP switch of claim 8, wherein the call termination treatment comprises terminating the voice call to a voice mail service associated with the CdPN.

12. The VoIP switch of claim 8, wherein the call termination treatment comprises associating a label with the voice call in conjunction with offering the voice call to a mobile phone associated with the CdPN.

13. The VoIP switch of claim 12, wherein the label indicates to a user of the mobile phone the CPN is spoofed.

14. The VoIP switch of claim 8, wherein the VoIP switch is different from the S/S enabled switch and the VoIP switch receives the voice call from the S/S enabled switch.

15. A non-transitory computer readable medium comprising instructions that when executed by one or more computer processors for a mobile telephone switching office ("MTSO") serving wireless subscribers, cause the one or more computer processors to:

determine a call establishment request message of a call does not include a digital certificate authenticating a calling party number ("CPN");

determine the call establishment request message indicates the CPN and a called party number ("CdPN"), wherein the CdPN indicates a wireless telephone number served by the MTSO;

determine a local routing number ("LRN") associated with the CPN;

determine the LRN of the CPN is associated with a SHAKEN/STIR ("S/S") enabled VoIP switch; and provide call termination treatment for the call based on determining the LRN is associated with the S/S enabled VoIP switch and the call establishment request message does not include the digital certificate.

16. The non-transitory computer readable medium of claim 15, wherein the call termination treatment comprises terminating the call and providing an intercept announcement to a calling party.

17. The non-transitory computer readable medium of claim 15, wherein the call termination treatment comprises terminating the call to a voice mail service associated with the CdPN.

18. The non-transitory computer readable medium of claim 15, wherein the call termination treatment comprises associating a label with the call in conjunction with offering the call to a mobile phone associated with the CdPN.

19. The non-transitory computer readable medium of claim 15, wherein the S/S enabled VoIP switch is the MTSO.

20. The non-transitory computer readable medium of claim 15, wherein the S/S enabled VoIP switch is another VoIP switch routing the call to the MTSO.

* * * * *